(12) United States Patent
Kentner

(10) Patent No.: US 9,586,637 B2
(45) Date of Patent: Mar. 7, 2017

(54) CART ASSEMBLY

(71) Applicant: Larry Byron Kentner, Poulsbo, WA (US)

(72) Inventor: Larry Byron Kentner, Poulsbo, WA (US)

( * ) Notice: Subject to any disclaimer, the term of this patent is extended or adjusted under 35 U.S.C. 154(b) by 0 days.

(21) Appl. No.: 14/750,391

(22) Filed: Jun. 25, 2015

(65) Prior Publication Data

US 2016/0375945 A1 Dec. 29, 2016

(51) Int. Cl.
*B62D 63/08* (2006.01)
*B60D 1/01* (2006.01)
*B60R 9/00* (2006.01)

(52) U.S. Cl.
CPC ............ *B62D 63/08* (2013.01); *B60D 1/01* (2013.01); *B60R 9/00* (2013.01)

(58) Field of Classification Search
CPC .... B62D 63/08; B62D 63/062; B62D 63/064; B60R 9/00; B60R 9/06; B60R 9/08; B60R 11/00; B60R 2011/004
USPC .................................. 280/504; 224/519, 521
See application file for complete search history.

(56) References Cited

U.S. PATENT DOCUMENTS

| | | | |
|---|---|---|---|
| 3,913,811 A * | 10/1975 | Spencer | B60R 9/06 224/497 |
| 4,593,840 A | 6/1986 | Chown | |
| 4,666,359 A | 5/1987 | Parr | |
| 4,744,590 A * | 5/1988 | Chesney | B60R 9/06 224/520 |
| 4,759,559 A * | 7/1988 | Moulton | B62B 1/12 280/204 |
| 5,029,740 A * | 7/1991 | Cox | B61D 47/00 190/15.1 |
| 5,806,738 A * | 9/1998 | D'Angelo | B60R 9/08 224/274 |
| D409,557 S * | 5/1999 | Armour | B60R 9/06 D12/408 |
| 6,019,266 A * | 2/2000 | Johnson | B60R 9/06 224/508 |
| 6,164,896 A | 12/2000 | Cummins | |
| 6,168,058 B1 * | 1/2001 | Janek | B60R 9/065 220/9.2 |
| D437,578 S * | 2/2001 | Stannard-Warne | B60R 9/06 D12/406 |
| 6,254,117 B1 | 7/2001 | Cross | |
| 6,309,167 B1 * | 10/2001 | Mc Pherrin | B60P 1/28 414/457 |
| D454,675 S | 3/2002 | Levy et al. | |
| 6,361,264 B1 * | 3/2002 | Guthrie | B65F 1/1473 224/521 |

(Continued)

FOREIGN PATENT DOCUMENTS

WO    WO9939960    8/1999

OTHER PUBLICATIONS

Fish-n-Mate Feb. 5, 2010.*

*Primary Examiner* — Joseph Rocca
*Assistant Examiner* — Michael Stabley

(57) ABSTRACT

A cart assembly includes a cart that has an upright section and a tongue section. The upright section may have an object removably secured thereto and the tongue section may be coupled to a vehicle thereby facilitating the cart to be towed. A basket is removably attached to the cart. The basket is positioned on the upright section such that the basket may contain an object.

18 Claims, 8 Drawing Sheets

(56) References Cited

U.S. PATENT DOCUMENTS

| | | | | |
|---|---|---|---|---|
| 6,427,854 B1 * | 8/2002 | Grossi | ............... | B60R 9/06 211/85.7 |
| 6,513,690 B1 * | 2/2003 | Churchill | ............... | B60R 9/06 224/404 |
| 6,554,171 B1 * | 4/2003 | Ewing, III | ............... | B60R 9/06 211/85.7 |
| 6,698,995 B1 * | 3/2004 | Bik | ............... | B60R 9/065 224/519 |
| 6,802,441 B1 * | 10/2004 | DuRant | ............... | B60R 9/065 224/513 |
| 6,935,656 B2 | 8/2005 | Stout | | |
| D528,965 S | 9/2006 | Wang | | |
| 7,101,142 B2 * | 9/2006 | Bik | ............... | B65F 1/1468 224/519 |
| 7,380,803 B2 * | 6/2008 | Thomas | ............... | B60R 9/06 224/519 |
| 7,614,637 B1 * | 11/2009 | Kidd | ............... | B60D 1/00 224/519 |
| 7,641,235 B1 * | 1/2010 | Anduss | ............... | B60R 9/06 224/509 |
| 7,905,508 B2 | 3/2011 | Crawford et al. | | |
| 8,061,571 B2 * | 11/2011 | Aghajanian | ............... | B60R 9/06 224/499 |
| 8,061,572 B2 | 11/2011 | Myrex | | |
| 8,128,115 B2 * | 3/2012 | Byrd | ............... | B60D 1/187 224/309 |
| 8,162,192 B1 * | 4/2012 | Sanchez | ............... | B60D 1/155 224/521 |
| 8,444,166 B1 | 5/2013 | Jarvis | | |
| 8,556,145 B1 * | 10/2013 | Ezra | ............... | B60R 9/045 224/498 |
| 8,820,598 B2 * | 9/2014 | Tennyson | ............... | B60R 9/065 224/509 |
| 8,944,742 B2 * | 2/2015 | Hill | ............... | B60R 9/06 414/462 |
| 9,199,583 B2 * | 12/2015 | Tressel | ............... | B60R 9/06 |
| D757,612 S * | 5/2016 | Woller | ............... | B60R 9/06 D12/106 |
| 2003/0071505 A1 * | 4/2003 | Ferrell, Jr. | ............... | B60P 3/36 297/352 |
| 2004/0219003 A1 * | 11/2004 | Bik | ............... | B65F 1/1468 414/462 |
| 2004/0232184 A1 * | 11/2004 | Moen | ............... | B60R 9/06 224/510 |
| 2005/0133556 A1 * | 6/2005 | Bolin | ............... | B60R 9/065 224/509 |
| 2005/0205630 A1 * | 9/2005 | Cooper | ............... | B60R 9/12 224/521 |
| 2007/0262108 A1 * | 11/2007 | Columbia | ............... | B60R 9/06 224/519 |
| 2008/0101899 A1 * | 5/2008 | Slonecker | ............... | B60D 1/00 414/462 |
| 2009/0028679 A1 * | 1/2009 | Smith | ............... | B60P 1/4421 414/462 |
| 2009/0101685 A1 * | 4/2009 | Robb | ............... | B60R 9/065 224/495 |
| 2009/0283987 A1 * | 11/2009 | Long | ............... | B60D 1/065 280/498 |
| 2010/0224663 A1 * | 9/2010 | Butler, III | ............... | B60R 9/06 224/498 |
| 2015/0175084 A1 * | 6/2015 | Tressel | ............... | B60R 9/08 224/499 |

* cited by examiner

CART ASSEMBLY

BACKGROUND OF THE DISCLOSURE

Field of the Disclosure

The disclosure relates to cart devices and more particularly pertains to a new cart device for transporting an object.

SUMMARY OF THE DISCLOSURE

An embodiment of the disclosure meets the needs presented above by generally comprising a cart that has an upright section and a tongue section. The upright section may have an object removably secured thereto and the tongue section may be coupled to a vehicle thereby facilitating the cart to be towed. A basket is removably attached to the cart. The basket is positioned on the upright section such that the basket may contain an object.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
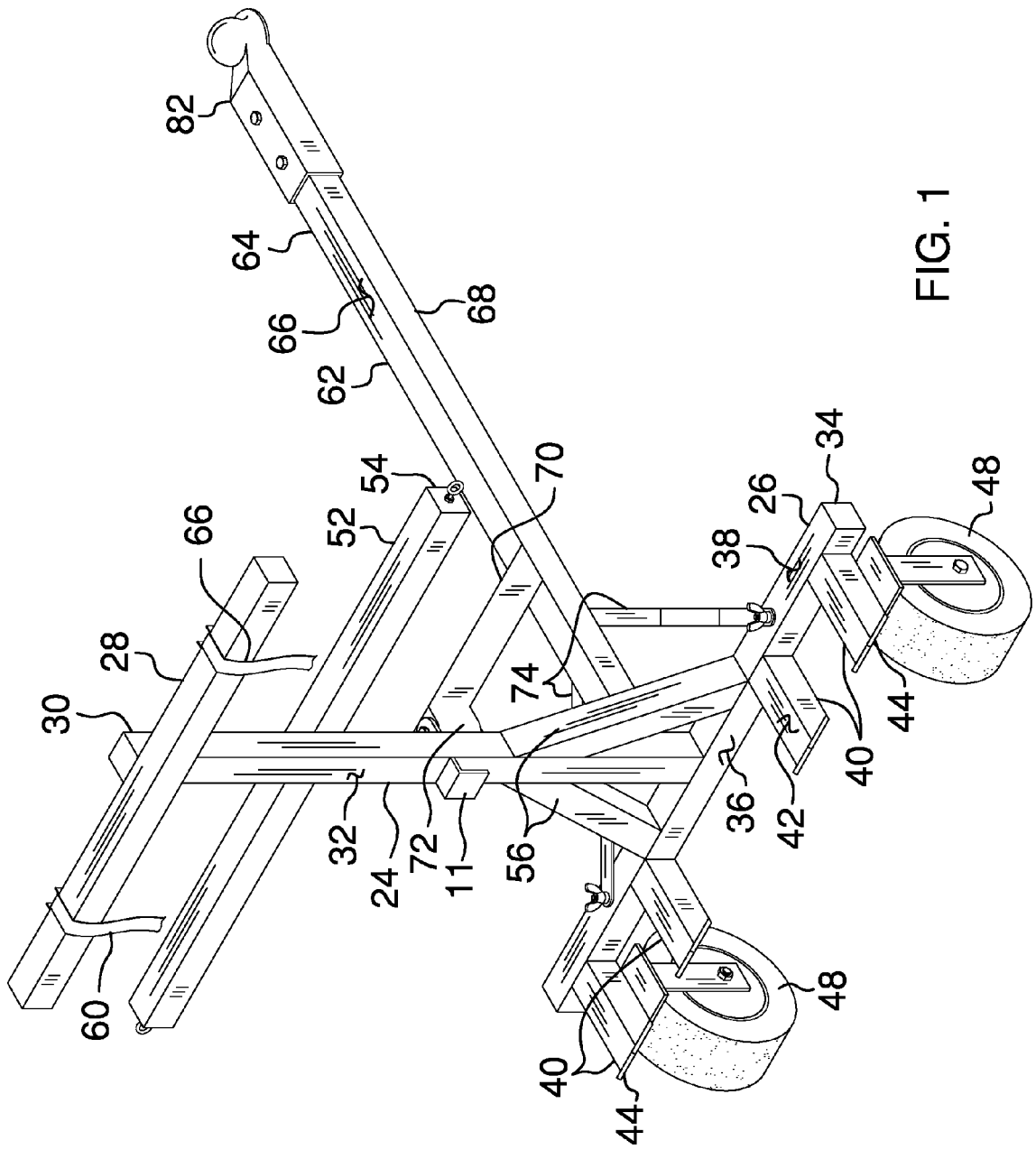
FIG. 1 is a perspective view of a cart assembly according to an embodiment of the disclosure.
Figure 2:
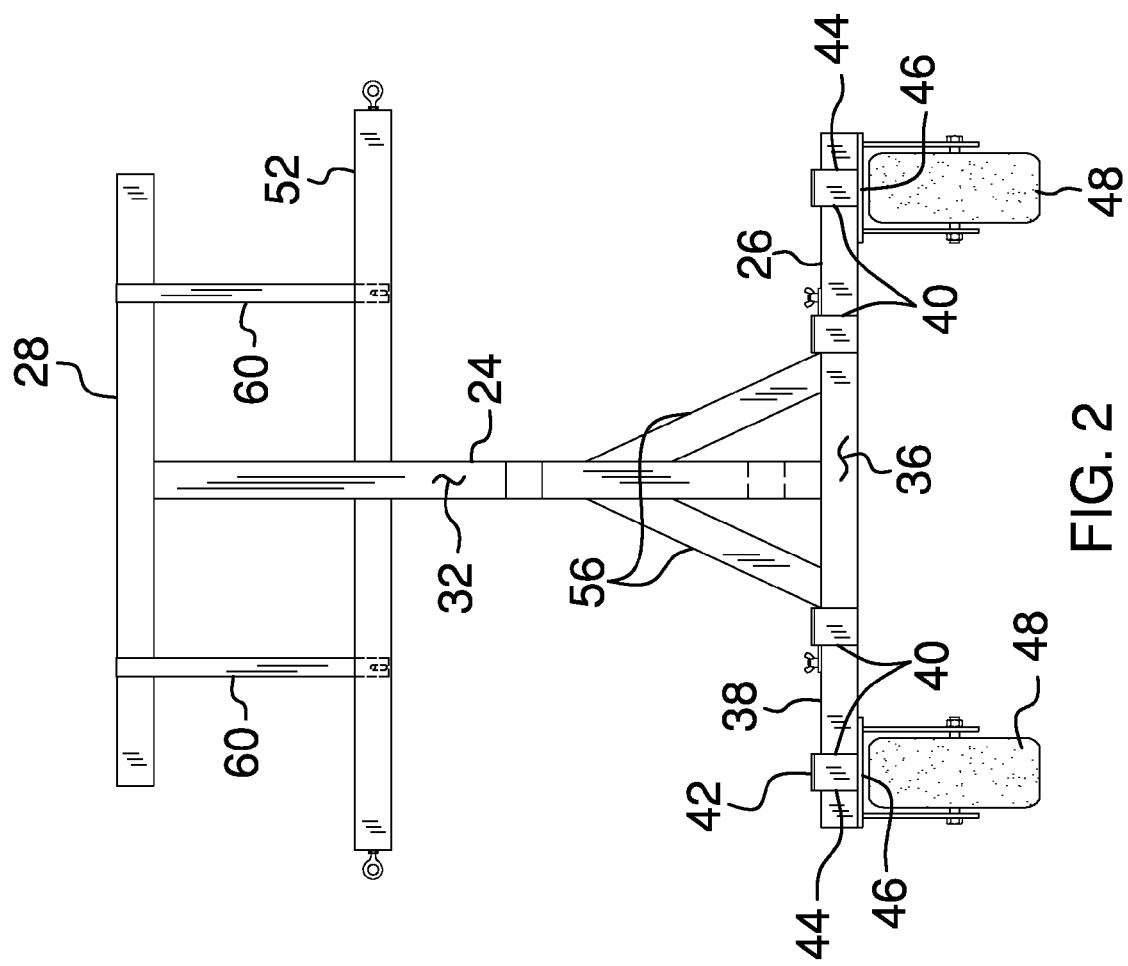
FIG. 2 is a back view of an embodiment of the disclosure.
Figure 3:
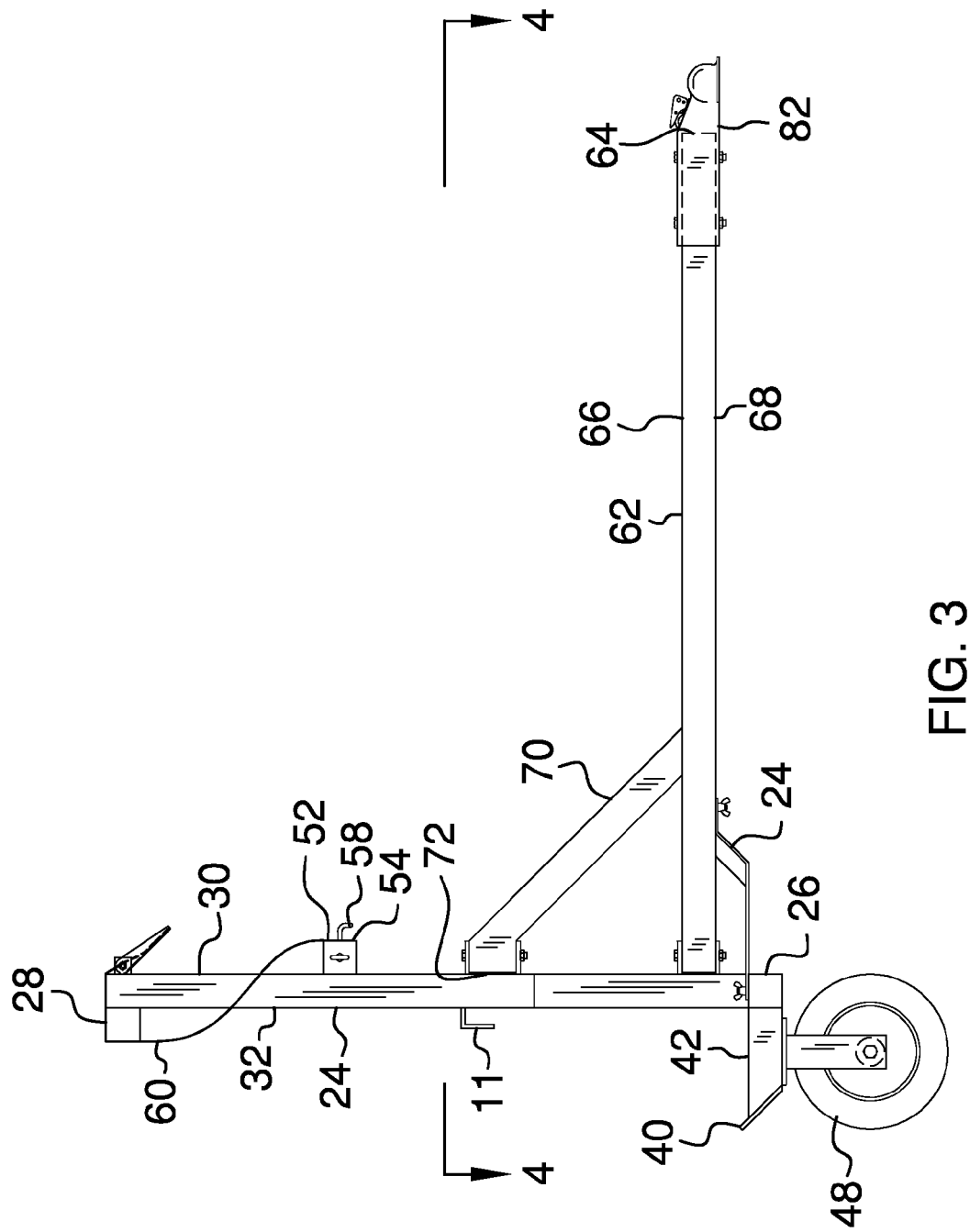
FIG. 3 is a right side view of an embodiment of the disclosure.
Figure 4:
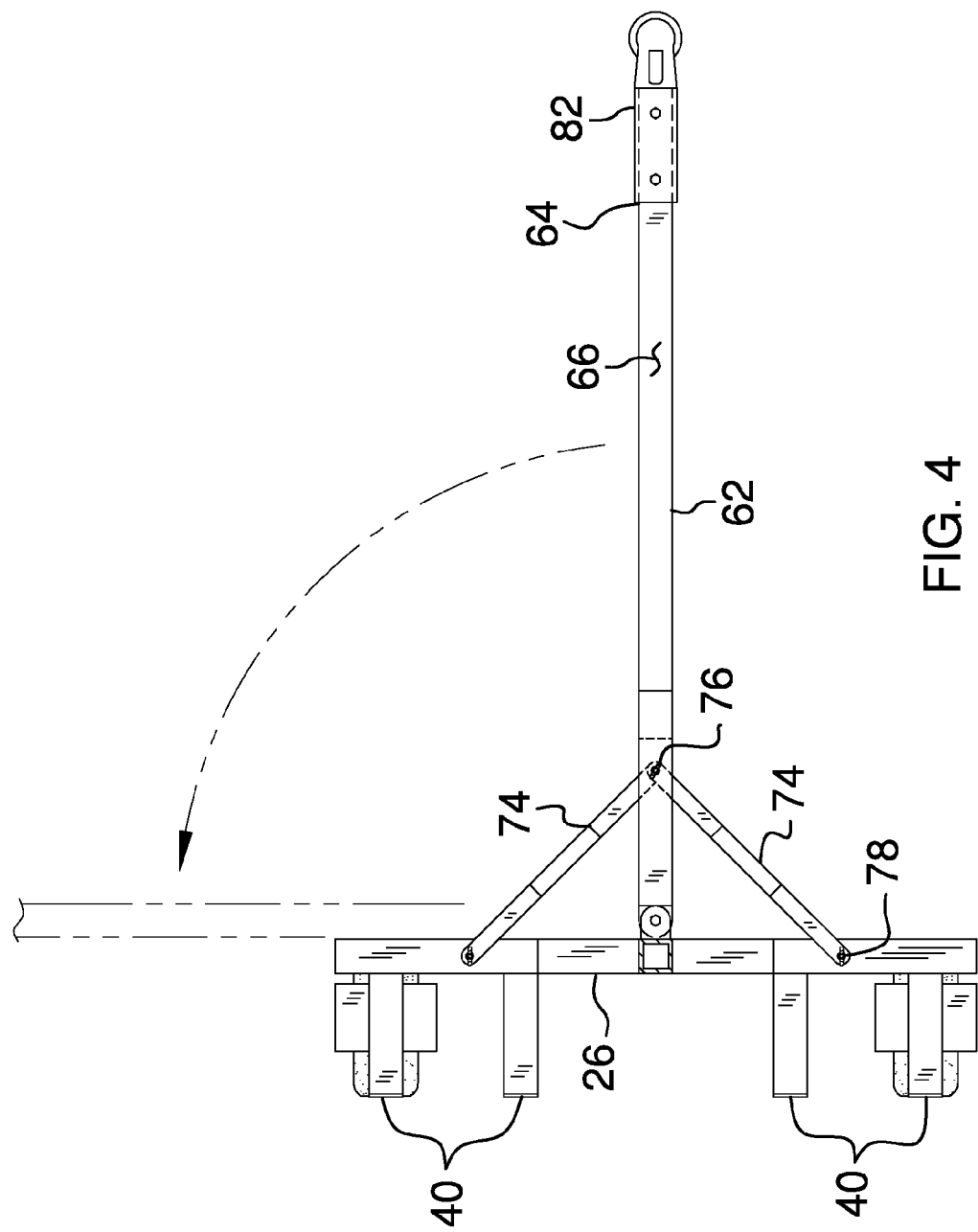
FIG. 4 is a top view of an embodiment of the disclosure.
Figure 5:
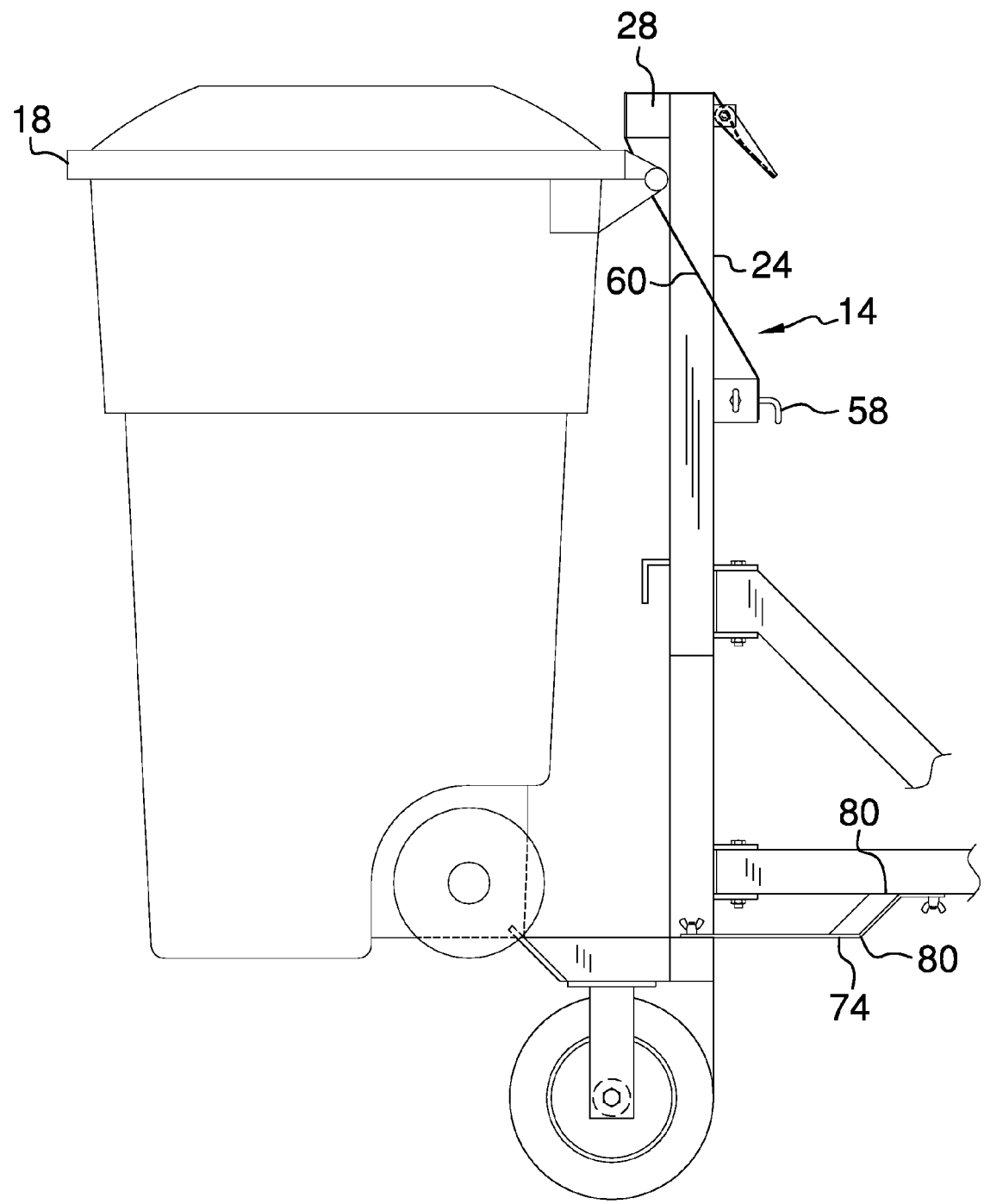
FIG. 5 is a right side in-use view of an embodiment of the disclosure.
Figure 6:
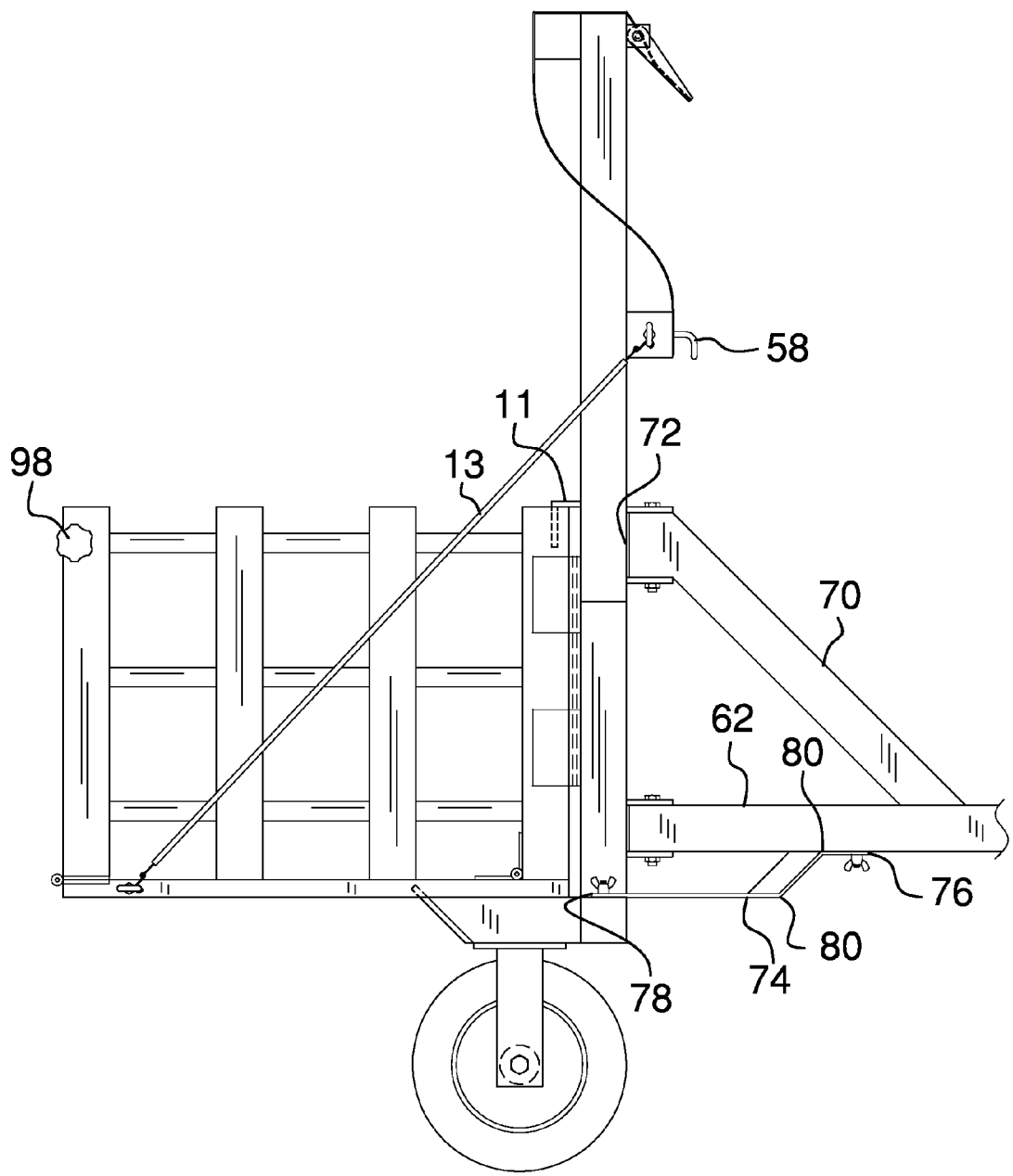
FIG. 6 is a right side perspective view of a basket of an embodiment of the disclosure.
Figure 7:
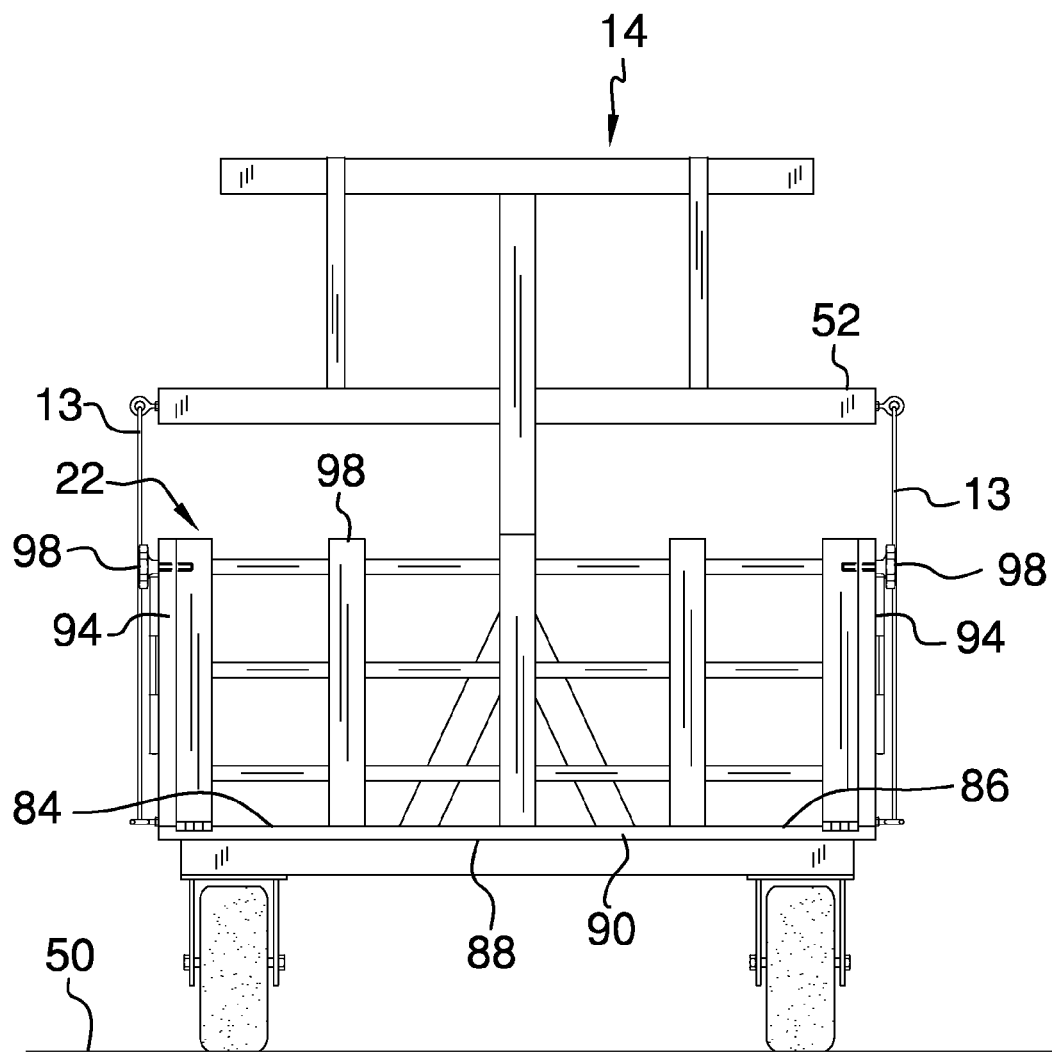
FIG. 7 is a back perspective view of the basket of an embodiment of the disclosure.
Figure 8:
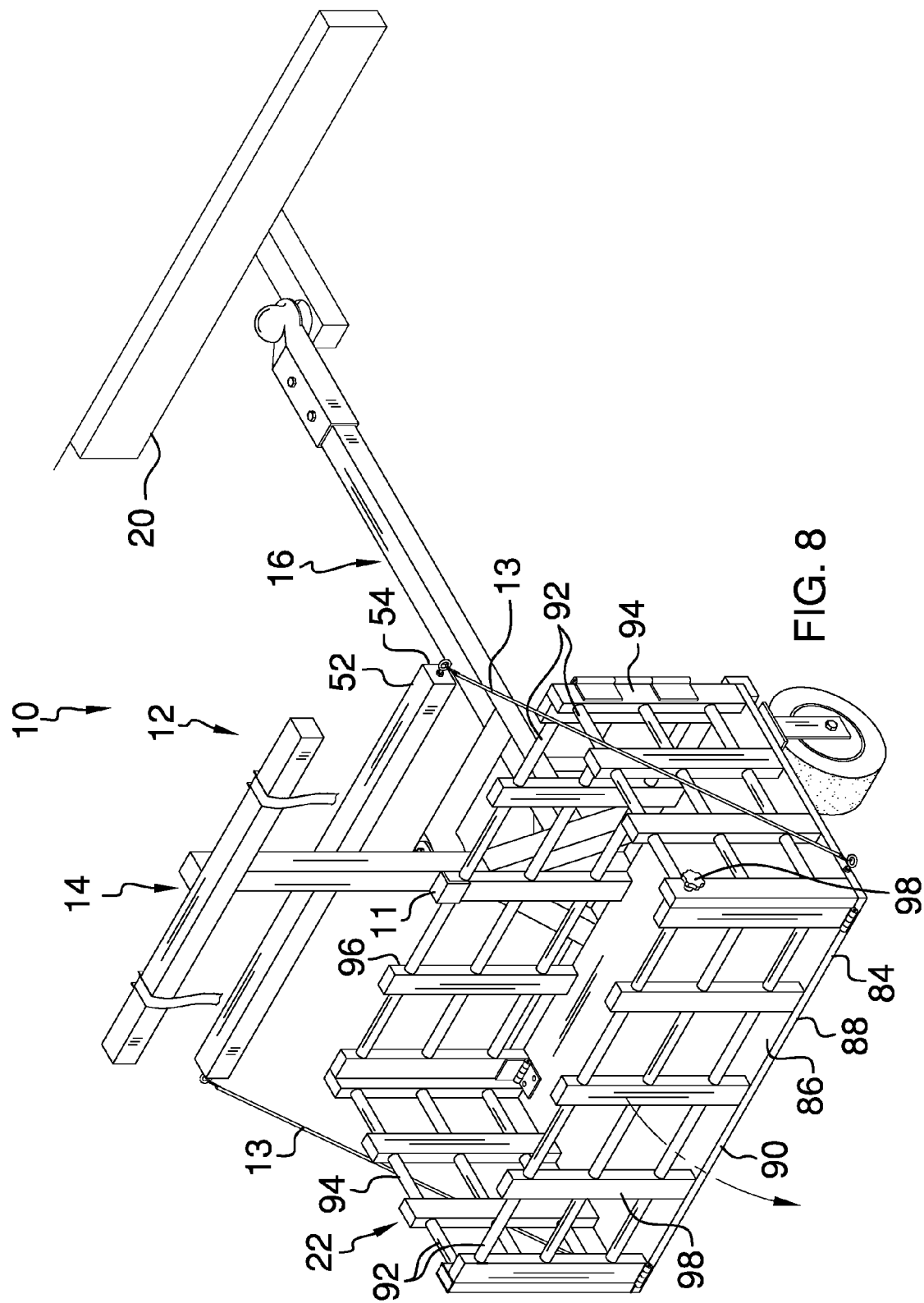
FIG. 8 is a top perspective in-use view of a basket of an embodiment of the disclosure.

With reference now to the drawings, and in particular to FIGS. 1 through 8 thereof, a new cart device embodying the principles and concepts of an embodiment of the disclosure and generally designated by the reference numeral 10 will be described.

As best illustrated in FIGS. 1 through 8, the cart assembly 10 generally comprises a cart 12 that has an upright section 14 and a tongue section 16. The upright section 14 may have an object 18 removably secured thereto. The tongue section 16 may be coupled to a vehicle 20 thereby facilitating the cart 12 to be towed. A basket 22 is removably attached to the cart 12 and the basket 22 is positioned on the upright section 14 such that the basket 22 may contain an object 18.

The upright section 14 comprises a longitudinal member 24 that is attached to and extends between a bottom lateral member 26 and a top lateral member 28. The bottom lateral member 26 and the top lateral member 28 are spaced apart from each other and the longitudinal member 24 is centrally positioned on each of the top lateral member 28 and the bottom lateral member 26. The longitudinal member 24 has a front surface 30 and a back surface 32 and the top lateral member 28 is positioned on the back surface 32 of the longitudinal member 24. The bottom lateral member 26 has a front surface 34, a back surface 36 and a top surface 38.

A plurality of supports 40 is provided and each of the supports 40 is coupled to and extends away from the back surface 36 of the bottom lateral member 26. The supports 40 are spaced apart from each other and are distributed along the bottom lateral member 26. Each of the supports 40 has a top surface 42 and the top surface 42 of each of the supports 40 may have the object 18 supported thereon. The plurality of supports 40 includes an outermost pair 44 of the supports 40 and each of the outermost supports 44 has a bottom surface 46. The object 18 may be a trash can or other heavy object that routinely needs to be moved.

A pair of wheels 48 is provided and each of the wheels 48 is rotatably coupled to the bottom surface 46 of an associated one of the outermost supports 44. Each of the wheels 48 may roll along a support surface 50 and the support surface 50 may be ground. A medial member 52 is provided and the medial member 52 is coupled to the front surface 30 of the longitudinal member 24. The medial member 52 is positioned closer to the top lateral member 28 than the bottom lateral member 26 and the medial member 52 has a front surface 54.

A pair of gussets 56 is each attached between the longitudinal member 24 and the bottom lateral member 26. Each of the gussets 56 is positioned on opposite sides of the longitudinal member 24. A pair of hooks 58 is provided and each of the hooks 58 is coupled to the front surface 54 of the medial member 52. The hooks 58 are spaced apart from each other and a pair of straps 60 is provided. Each of the straps 60 is coupled to the top lateral member 28 and the straps 60 are spaced apart from each other. Each of the straps 60 may be wrapped around the object 18 and each of the straps 60 selectively engages an associated one of the hooks 58. Thus, each of the straps 60 may secure the object 18 on the supports 40.

The tongue section 16 comprises a first member 62 that is hingedly coupled to the front surface 30 of the longitudinal member 24 and the first member 62 is positioned closer to the bottom lateral member 26 than the top lateral member 28. The first member 62 has a distal end 64 with respect to the longitudinal member 24 and the first member 62 has a top surface 66 and a bottom surface 68. The first member 62 is positionable in a deployed position having the first member 62 forming a right angle with respect to the longitudinal member 24. The first member 62 may be attached to the vehicle 20 when the first member 62 is positioned in the deployed position. The first member 62 is positionable in a stored position having the first member 62 being substantially coextensive with the bottom lateral member 26 thereby facilitating the cart 12 to be stored.

An arm 70 is attached to the top surface 66 of the first member 62 and the arm 70 angles upwardly from the first member 62. The arm 70 has a distal end 72 with respect to the first member 62 and the distal end 72 of the arm 70 is hingedly coupled to the front surface 30 of the longitudinal member 24. Thus, the arm 70 increases a load capacity of the tongue section 16.

A pair of braces 74 is provided and each of the braces 74 has a first end 76 and a second end 78. Each of the braces 74 has a pair of bends 80 thereon and the bends 80 on each of the braces 74 are spaced apart from each other. The bends 80 are distributed between the first end 76 and the second end 78 of an associated one of the braces 74 and the pair of bends 80 on each of the braces 74 is congruent with each other. Each of the braces 74 is removably coupled between the bottom surface 68 of the first member 62 and the top surface 38 of the bottom lateral member 26 when the first member 62 is positioned in the deployed position. Each of the braces 74 is removable from between the bottom lateral member 26 and the first member 62 thereby facilitating the first member 62 to be positioned in the stored position. A hitch 82 is attached to the distal end 64 of the first member 62 such that the hitch 82 may be removably coupled to the vehicle 20. The hitch 82 may be a ball hitch or the like.

The basket 22 comprises a platform 84 that has a top side 86, a bottom side 88 and a peripheral edge 90 extending between the top side 86 and the bottom side 88. The platform 84 is positioned such that the bottom side 88 abuts the top surface 42 of each of the supports 40 such that the platform 84 may support an object 18. A plurality of gates 92 is provided and each of the gates 92 is attached to and extends upwardly from the top side 86 of the platform 84. The gates 92 are distributed around the peripheral edge 90 of the platform 84 such that the gates 92 retain the object 18 on the platform 84.

The plurality of gates 92 includes a pair of lateral gates 94, a front gate 96 and a rear gate 98. Each of the lateral gates 94 is hingedly coupled to the front gate 96 such that each of the lateral gates 94 may be selectively swung outwardly from the platform 84. A pair of locks 98 is each attached to an associated one of the lateral gates 94. Each of the locks 98 removably engages the front gate 96 thereby retaining each of the lateral gates 94 in a closed position. The rear gate 98 is hingedly coupled to the platform 84 such that the rear gate 98 may be selectively swung downwardly from the platform 84. Thus, the rear gate 98 may extend between the platform 84 and the support surface 50.

A clip 11 is attached to the back surface 32 of the longitudinal member 24 and the clip 11 is centrally positioned on the longitudinal member 24. The clip 11 engages the front gate 96 when the platform 84 is positioned on the supports 40 thereby retaining the basket 22 on the cart 12. A pair of cords 13 is provided and each of the cords 13 is removably attached between the medial member 52 and the platform 84. Each of the cords 13 supports a weight of the object 18 positioned in the basket 22.

In use, the first member 62 is positioned in the deployed position and the hitch 82 is coupled to the vehicle 20. The object 18 is positioned on the supports 40 and each of the straps 60 is manipulated to secure the object 18 on the upright section 14. Alternatively, the basket 22 is attached to the upright section 14 and the object 18 is placed within the basket 22. The first member 62 is positioned in the stored position thereby facilitating the cart 12 to be stored.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cart assembly having a removable basket, said assembly comprising:

a cart having an upright section and a tongue section, said upright section being configured to have an object removably secured thereto, said tongue section being configured to be coupled to a vehicle thereby facilitating said cart to be towed, said upright section including a plurality of supports, each of said supports having a top surface; and a basket being removably attached to said cart, said basket being positioned on said upright section wherein said basket is configured to contain the object, said basket comprising a platform having a top side, a bottom side and a peripheral edge extending between said top side and said bottom side, said platform being positioned such that said bottom side abuts said top surface of each of said supports wherein said platform is configured to support the object, said basket further comprising a plurality of gates extending upwardly from the top side of the platform.

2. The assembly according to claim 1, wherein said upright section comprises a longitudinal member being attached to and extending between a bottom lateral member and a top lateral member, said bottom lateral member and said top lateral member being spaced apart from each other, said longitudinal member being centrally positioned on each of said top lateral member and said bottom lateral member, said longitudinal member having a front surface and a back surface, said bottom lateral member having a front surface, a back surface and a top surface, said top lateral member being positioned on said back surface of said longitudinal member.

3. The assembly according to claim 2, wherein each of said supports being coupled to and extending away from said back surface of said bottom lateral member, said supports being spaced apart from each other and being distributed along said bottom lateral member, said top surface of each of said supports being configured to have the object supported thereon, said plurality of supports including an outermost pair of said supports, each of said outermost supports having a bottom surface.

4. The assembly according to claim 3, wherein said upright section further includes a pair of wheels, each of said wheels being rotatably coupled to said bottom surface of an associated one of said outermost supports, each of said wheels being configured to roll along a support surface.

5. The assembly according to claim 1, wherein:

said upright section includes a longitudinal member, a top lateral member and a bottom lateral member, said longitudinal member having a front surface; and said tongue section comprises a first member being hingedly coupled to said front surface of said longitudinal member, said first member being positioned closer to said bottom lateral member than said top lateral member, said first member having a distal end with respect to said longitudinal member, said first member having a top surface and a bottom surface.

6. The assembly according to claim 5, wherein said first member is positionable in a deployed position having said first member forming a right angle with respect to said longitudinal member, said first member being positionable in a stored position having said first member being substantially coextensive with said bottom lateral member.

7. The assembly according to claim 5, wherein:
said longitudinal member has a front surface; and
said tongue section further comprises an arm being attached to said top surface of said first member, said arm angling upwardly from said first member, said arm having a distal end with respect to said first member, said distal end of said arm being hingedly coupled to said front surface of said longitudinal member wherein said arm is configured to increase a load capacity of said tongue section.

8. The assembly according to claim 1, wherein said gates being distributed around said peripheral edge of said platform wherein each of said gates is configured to retain the object on said platform.

9. The assembly according to claim 8, wherein said plurality of gates includes a pair of lateral gates, a front gate and a rear gate, each of said lateral gates being hingedly coupled to said front gate such that each of said lateral gates may be selectively swung outwardly from said platform, said rear gate being hingedly coupled to said platform such that said rear gate may be selectively swung downwardly wherein said rear gate is configured to extend between said platform and a support surface.

10. The assembly according to claim 1, further comprising:
a medial member and a platform; and
a pair of cords, each of said cord being removably attached between said medial member and said platform such that each of said cords is configured to support a weight of the object positioned in said basket.

11. The assembly of claim 1, further comprising:
said upright section comprising:
a longitudinal member being attached to and extending between a bottom lateral member and a top lateral member, said bottom lateral member and said top lateral member being spaced apart from each other, said longitudinal member being centrally positioned on each of said top lateral member and said bottom lateral member, said longitudinal member having a front surface and a back surface, said bottom lateral member having a front surface, a back surface and a top surface, said top lateral member being positioned on said back surface of said longitudinal member,
each of said supports being coupled to and extending away from said back surface of said bottom lateral member, said supports being spaced apart from each other and being distributed along said bottom lateral member, said top surface of each of said supports being configured to have the object supported thereon, said plurality of supports including an outermost pair of said supports, each of said outermost supports having a bottom surface,
a pair of wheels, each of said wheels being rotatably coupled to said bottom surface of an associated one of said outermost supports, each of said wheels being configured to roll along a support surface,
a medial member, said medial member being coupled to said front surface of said longitudinal member, said medial member being positioned closer to said top lateral member than said bottom lateral member, said medial member having a front surface,
a pair of gussets, each of said gussets being attached between said longitudinal member and said bottom lateral member, each of said gussets being positioned on opposite sides of said longitudinal member,
a pair of hooks, each of said hooks being coupled to said front surface of said medial member, said hooks being spaced apart from each other, and
a pair of straps, each of said straps being coupled to said top lateral member, said straps being spaced apart from each other, each of said straps selectively engaging an associated one of said hooks wherein each of said straps is configured to secure the object on said supports;
said tongue section comprising:
a first member being hingedly coupled to said front surface of said longitudinal member, said first member being positioned closer to said bottom lateral member than said top lateral member, said first member having a distal end with respect to said longitudinal member, said first member having a top surface and a bottom surface, said first member being positionable in a deployed position having said first member forming a right angle with respect to said longitudinal member, said first member being positionable in a stored position having said first member being substantially coextensive with said bottom lateral member,
an arm being attached to said top surface of said first member, said arm angling upwardly from said first member, said arm having a distal end with respect to said first member, said distal end of said arm being hingedly coupled to said front surface of said longitudinal member wherein said arm is configured to increase a load capacity of said tongue section,
a pair of braces, each of said braces having a first end and a second end, each of said braces having a pair of bends thereon, said bends on each of said braces being spaced apart from each other and being distributed between said first end and said second end of an associated one of said braces, said pair of bends on each of said braces being congruent with each other, each of said braces being removably coupled between said bottom surface of said first member and said top surface of said bottom lateral member when said first member is positioned in said deployed position, each of said braces being removed between said bottom lateral member and said first member thereby facilitating said first member to be positioned in said stored position, and
a hitch being attached to said distal end of said first member wherein said hitch is configured to be removably coupled to the vehicle;
said basket comprising:
a plurality of gates, each of said gates being attached to and extending upwardly from said top side of said platform, said gates being distributed around said peripheral edge of said platform wherein each of said gates is configured to retain the object on said platform, said plurality of gates including a pair of lateral gates, a front gate and a rear gate, each of said lateral gates being hingedly coupled to said front gate such that each of said lateral gates may be selectively swung outwardly from said platform, said rear gate being hingedly coupled to said platform such that said rear gate may be selectively swung downwardly wherein said rear gate is configured to extend between said platform and the support surface, and a pair of cords, each of said cord being removably attached between said medial member and said platform such that each of said cords is configured to support a weight of the object positioned in said basket.

12. A cart assembly having a removable basket, said assembly comprising:

a cart having an upright section and a tongue section, said upright section being configured to have an object removably secured thereto, said tongue section being configured to be coupled to a vehicle thereby facilitating said cart to be towed;

a basket being removably attached to said cart, said basket being positioned on said upright section wherein said basket is configured to contain the object;

wherein said upright section comprises a longitudinal member being attached to and extending between a bottom lateral member and a top lateral member, said bottom lateral member and said top lateral member being spaced apart from each other, said longitudinal member being centrally positioned on each of said top lateral member and said bottom lateral member, said longitudinal member having a front surface and a back surface, said bottom lateral member having a front surface, a back surface and a top surface, said top lateral member being positioned on said back surface of said longitudinal member;

wherein said upright section further comprises a plurality of supports, each of said supports being coupled to and extending away from said back surface of said bottom lateral member, said supports being spaced apart from each other and being distributed along said bottom lateral member, each of said supports having a top surface, said top surface of each of said supports being configured to have the object supported thereon, said plurality of supports including an outermost pair of said supports, each of said outermost supports having a bottom surface;

wherein said upright section further includes a pair of wheels, each of said wheels being rotatably coupled to said bottom surface of an associated one of said outermost supports, each of said wheels being configured to roll along a support surface; and wherein said upright section further includes a medial member, said medial member being coupled to said front surface of said longitudinal member, said medial member being positioned closer to said top lateral member than said bottom lateral member, said medial member having a front surface.

13. The assembly according to claim 12, wherein said upright section further comprises a pair of gussets, each of said gussets being attached between said longitudinal member and said bottom lateral member, each of said gussets being positioned on opposite sides of said longitudinal member.

14. The assembly according to claim 13, wherein said upright section further comprises a pair of hooks, each of said hooks being coupled to said front surface of said medial member, said hooks being spaced apart from each other.

15. The assembly according to claim 14, wherein said upright section further comprises a pair of straps, each of said straps being coupled to said top lateral member, said straps being spaced apart from each other, each of said straps selectively engaging an associated one of said hooks wherein each of said straps is configured to secure the object on said supports.

16. A cart assembly having a removable basket, said assembly comprising:

a cart having an upright section and a tongue section, said upright section being configured to have an object removably secured thereto, said tongue section being configured to be coupled to a vehicle thereby facilitating said cart to be towed;

a basket being removably attached to said cart, said basket being positioned on said upright section wherein said basket is configured to contain the object;

said upright section includes a longitudinal member, a top lateral member and a bottom lateral member, said longitudinal member having a front surface;

said tongue section comprises a first member being hingedly coupled to said front surface of said longitudinal member, said first member being positioned closer to said bottom lateral member than said top lateral member, said first member having a distal end with respect to said longitudinal member, said first member having a top surface and a bottom surface;

said longitudinal member having a front surface;

said tongue section further comprising an arm being attached to said top surface of said first member, said arm angling upwardly from said first member, said arm having a distal end with respect to said first member, said distal end of said arm being hingedly coupled to said front surface of said longitudinal member wherein said arm is configured to increase a load capacity of said tongue section; and wherein said tongue section further comprises a pair of braces, each of said braces having a first end and a second end, each of said braces having a pair of bends thereon, said bends on each of said braces being spaced apart from each other and being distributed between said first end and said second end of an associated one of said braces, said pair of bends on each of said braces being congruent with each other.

17. The assembly according to claim 16, wherein:

said bottom lateral member has a top surface; and each of said braces is removably coupled between said bottom surface of said first member and said top surface of said bottom lateral member when said first member is positioned in said deployed position, each of said braces being removed between said bottom lateral member and said first member thereby facilitating said first member to be positioned in said stored position.

18. A cart assembly having a removable basket, said assembly comprising:

a cart having an upright section and a tongue section, said upright section being configured to have an object removably secured thereto, said tongue section being configured to be coupled to a vehicle thereby facilitating said cart to be towed;

a basket being removably attached to said cart, said basket being positioned on said upright section wherein said basket is configured to contain the object;

said upright section includes a longitudinal member, a top lateral member and a bottom lateral member, said longitudinal member having a front surface;

said tongue section comprises a first member being hingedly coupled to said front surface of said longitudinal member, said first member being positioned closer to said bottom lateral member than said top lateral member, said first member having a distal end with respect to said longitudinal member, said first member having a top surface and a bottom surface; and wherein said tongue section further comprises a hitch being attached to said distal end of said first member wherein said hitch is configured to be removably coupled to the vehicle.

* * * * *